US008888006B2

(12) United States Patent
Au

(10) Patent No.: US 8,888,006 B2
(45) Date of Patent: Nov. 18, 2014

(54) DECODER, A COUPLING CARD READER AND AN APPLICATION SYSTEM AND METHOD FOR THE SAME

(71) Applicant: Chun Au, Hong Kong (HK)

(72) Inventor: Chun Au, Hong Kong (HK)

( * ) Notice: Subject to any disclaimer, the term of this patent is extended or adjusted under 35 U.S.C. 154(b) by 8 days.

(21) Appl. No.: 13/888,395

(22) Filed: May 7, 2013

(65) Prior Publication Data
US 2013/0299584 A1 Nov. 14, 2013

(30) Foreign Application Priority Data
May 9, 2012 (HK) .................................. 12104560

(51) Int. Cl.
*G06K 7/06* (2006.01)
*G06K 19/067* (2006.01)
*A63F 13/98* (2014.01)

(52) U.S. Cl.
CPC .............. *G06K 7/065* (2013.01); *G06K 19/067* (2013.01); *A63F 13/02* (2013.01); *A63F 2300/206* (2013.01); *A63F 2300/209* (2013.01)
USPC ........................................................ 235/441

(58) Field of Classification Search
CPC G06K 19/067; G06K 7/065; G06K 19/07732
See application file for complete search history.

(56) References Cited

U.S. PATENT DOCUMENTS

| 3,922,529 | A | * | 11/1975 | Orloff ........................... 235/451 |
| 5,212,369 | A | * | 5/1993 | Karlisch et al. ............... 235/380 |
| 7,513,437 | B2 | * | 4/2009 | Douglas ........................ 235/492 |
| 2012/0095914 | A1 | * | 4/2012 | McKelvey et al. .............. 705/44 |

* cited by examiner

*Primary Examiner* — Thien M Le
*Assistant Examiner* — Asifa Habib

(57) ABSTRACT

The present application is directed to a decoder, a coupling card reader and an application system. The decoder includes a card base which is produced from at least one type of materials selected from paper card, plastic card, metal thin card or organic glass thin card. The surface of the card base is applied with conducting coating. The conducting coating is provided with a plurality of conducting logic expression regions. Different conducting logic expression regions possess individual and independent conductive nature. The conductive nature of each conductive logic expression region on the conductive coating together form a sole conductive logic data coding for differentiating a specific decoder so that the decoder can be distinguished from other decoders. The present application is also directed to a card reader to be used with the decoder. The present application enhances the security level of data.

12 Claims, 3 Drawing Sheets

1) Insert the decoder into the reader

Decoder

Reader

2) The reader transmit the data to the equipment via WiFi or USB

Transmit data via WiFi

Transmit data via USB

3) The data of the decoder and the data of the equipment correspond

4) The data after corresponding will appear on the automatic application program and proceed to game

DECODER, A COUPLING CARD READER AND AN APPLICATION SYSTEM AND METHOD FOR THE SAME

CROSS REFERENCE TO RELATED APPLICATIONS

This application claims the benefit of Hong Kong short-term patent application no. 12104560.8 filed on May 9, 2012; the contents of which are hereby incorporated by reference.

FIELD OF INVENTION

The present application is directed to a decoder, a coupling card reader and an application system and method for the same.

BACKGROUND

More and more digital products have become part of our lives. With application softwares, mobile equipments such as personal computers and smart phones provide various entertainments for user, such as gaming function. The ways to improve the data security in gaming and to enhance gaming experience become imminent concerns to developers.

SUMMARY

There is provided a decoder comprising a card base having a surface, wherein the surface of the card base is coated with a conductive coating and the conductive coating is provided with a plurality of conductive logic expression regions, each conductive logic expression region is provided with an individual and independent conductive nature, the conductive nature of each conductive logic expression region on the conductive coating together form a sole conductive logic data coding for differentiating a specific decoder so that the decoder can be distinguished from other decoders.

The card base is selected from at least one of the following materials; paper card, plastic card, metal thin card and organic glass card. The conductive nature of each conductive logic expression region corresponds to a data bit of the conductive logic data coding, the conductive logic data coding is a data sequence formed according to a pre-determined sequence by the corresponding data bit of each of the conductive logic expression region on the decoder. Further, the card base is printed with serial numbers comprises of series of characters, each character in the serial number is selected from at least a form of barcodes, English alphabets and numerals; the serial number of each decoder card corresponds to its conductive logic data coding and the serial number of each decoder is mutually independent.

The surface of the card base may be coated by means of printing or pad-printing with a conductive coating that uses a carbon film as the transmission medium, the conductive coating has an electrical characteristic suitable to be operated under a small electric current below 500 mA and low-voltage environment below 5V.

Each conductive logic expression region comprises a recognition circuit having a contact point, the contact point comprises an open and short state, the conductive nature of each conductive logic expression region is indicated by the open and short state of the contact point of its own recognition circuit.

In another embodiment of the present patent application, there is provided a system for applying to the decoder comprising a card reader that comprises a slot for insertion of the decoder and engagement with the conductive logic expression regions of the decoder by physical contact.

The conductive logic data coding of the decoder is read by way of physical contact between the slot and each of the conductive logic expression regions of the decoder.

The system further comprises terminal equipment, and the card reader further comprises an electronic code processor which compiles the conductive logic data coding to a cipher code using predefined data protocols comprising code conversion formulas, and a data port that connects to the processor and transmits the cipher code to the terminal equipment. The data port comprises a USB, wireless WIFI, or bluetooth interface. The physical contact between the slot and each of the conductive logic expression regions of the decoder is in matrix multibus form.

The cipher code comprises 4-8 groups of codes which are formed from 16-256 bit codes. Further, the terminal equipment is a personal computer or a mobile device running Microsoft Windows, Apple/Mac or Linux operating systems and comprises an applied processing unit for reading the cipher code and running associated applications. The terminal equipment further comprises a plurality of individually associated applications which are run by the terminal equipment via its coupled card reader and decoder; interactions of media contents of the associated applications between the terminal equipment and other terminal equipments running the same associated applications are achieved via networking.

In a further embodiment of the present patent application, there is provided a method of producing a decoder, comprising the steps of: making a card base; coating the card base by means of printing or pad-printing with a conductive coating that uses a carbon film as transmission medium; setting a plurality of conductive logic expression regions on the conductive coating; providing an individual and independent conductive nature, the conductive nature of each conductive logic expression region on the conductive coating together form a sole conductive logic data coding for differentiating a specific decoder so that the decoder can be distinguished from other decoder; and printing the card base with serial numbers comprise of series of characters, wherein each character in the serial number is selected from at least a form of barcodes, English alphabets and numerals; the serial number of each decoder corresponds to its conductive logic data coding; and the serial number of each decoder is mutually independent.

The method further comprises the step of providing an electrical characteristic of the conductive coating suitable to be operated under a small electric current below 500 mA and low-voltage environment below 5V. Each conductive logic expression region comprises a recognition circuit having a contact point, the contact point comprises an open and short state, the conductive nature of each conductive logic expression region is indicated by the open and short state of the contact point of its own recognition circuit.

The conductive nature of each conductive logic expression region corresponds to a data bit of the conductive logic data coding, wherein the conductive logic data coding is a data sequence formed according to a predetermined sequence by the corresponding data bit of each of the conductive logic expression region on the decoder.

DETAILED DESCRIPTION

Figure 1:
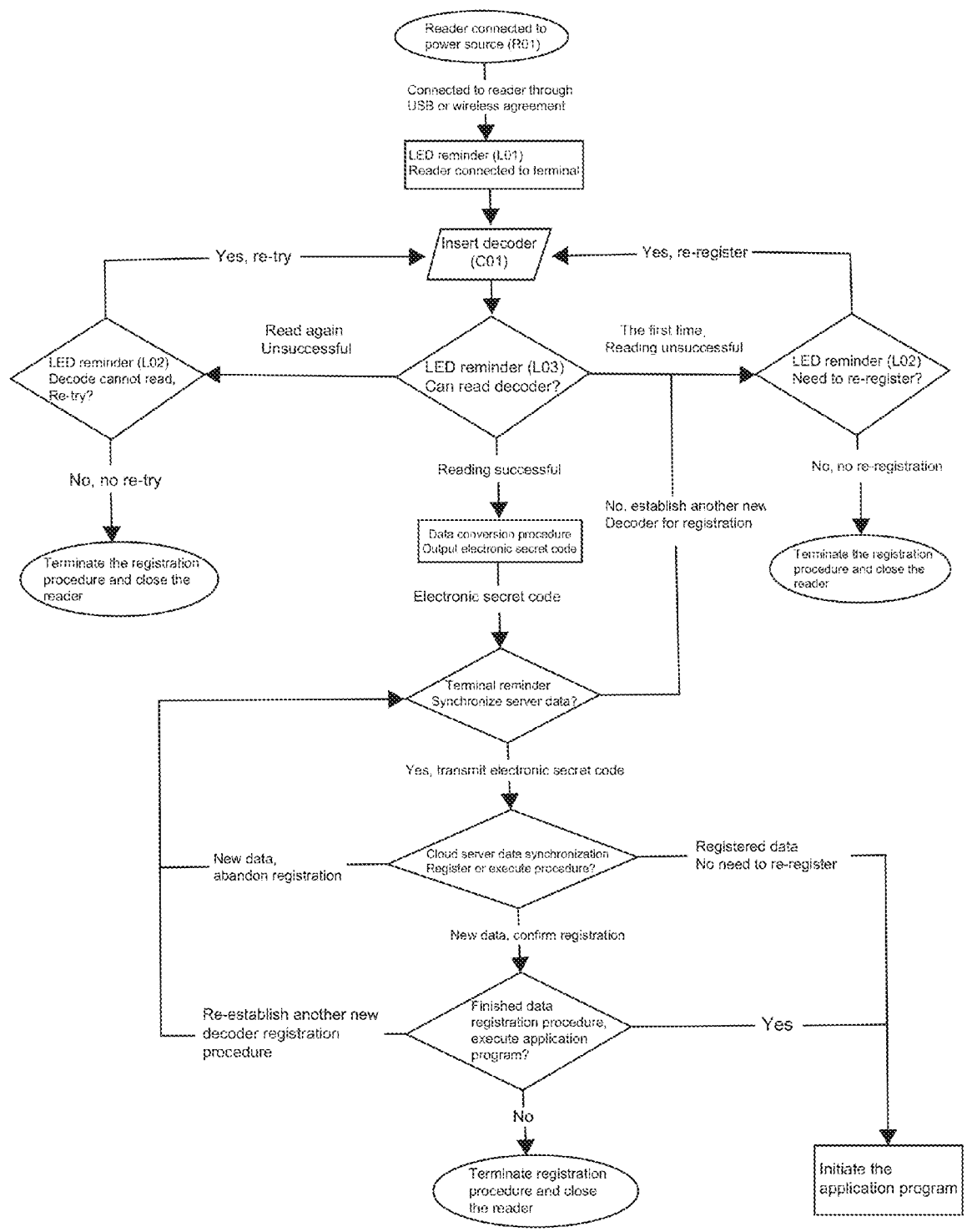
FIG. 1 is a flow chart of the basic operation of an applied system of a decoder for usage in an embodiment of the present application.
Figure 2:
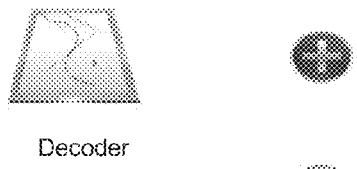
FIG. 2 is an illustrative view of the decoder and a coupling card reader in the embodiment of the present application.
Figure 2:
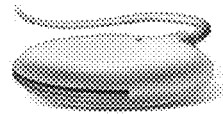
Figure 2:
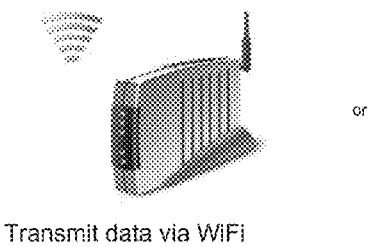
Figure 2:
Figure 2:
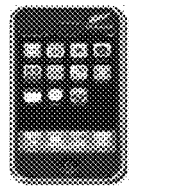
Figure 2:
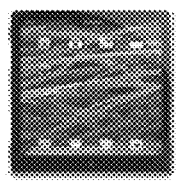
Figure 2:
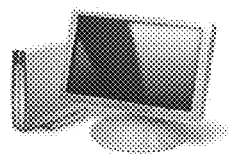
Figure 2:
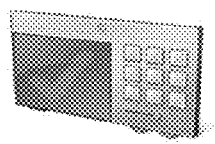
Figure 2:
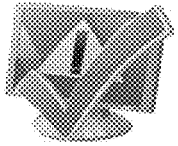
Figure 3:
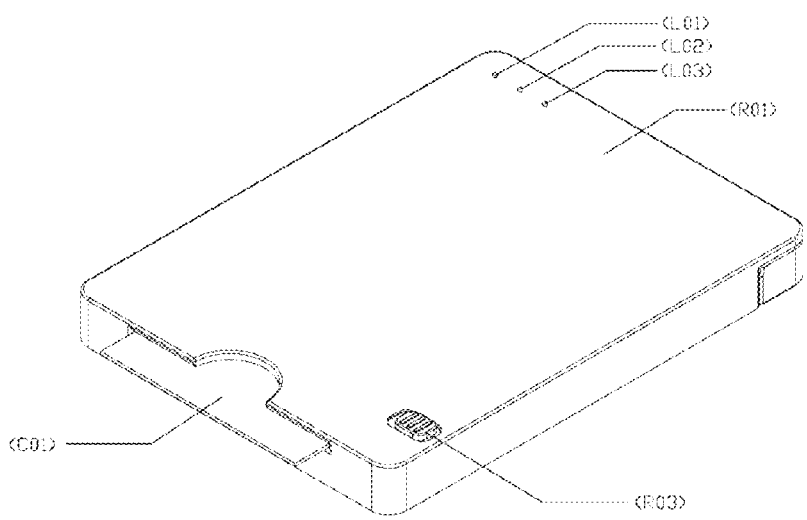
FIG. 3 is another illustrative view of the decoder and the coupling card reader in the embodiment of the present application.
Figure 4:
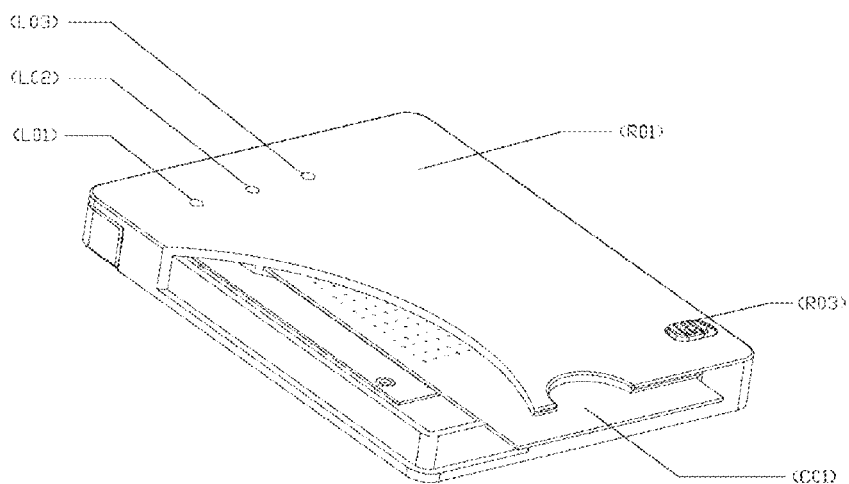
FIG. 4 is another illustrative view of the decoder and the coupling card reader in the embodiment of the present application.
Figure 5:
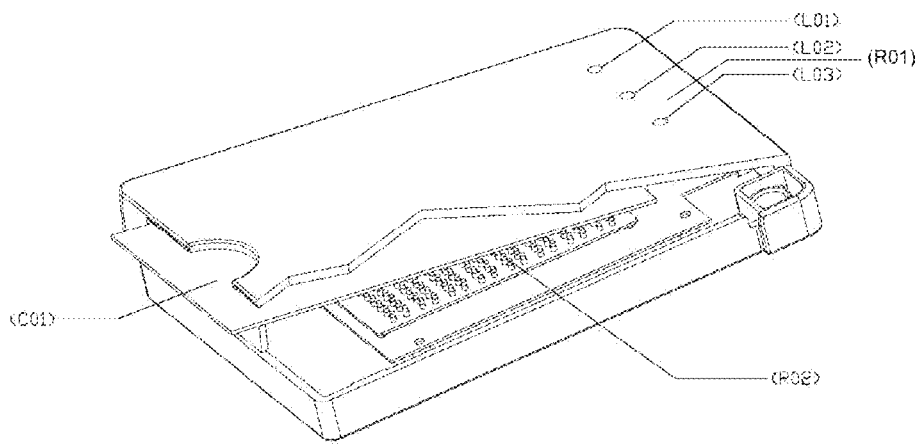
FIG. 5 is a flow chart of the specific operation of the applied system of the decoder for usage in the embodiment of the present application.

Further below is a detailed description of the present application through specific embodiments in combination with drawings.

The present patent application is mainly directed to a simple, convenient, inexpensive and quick application system and method. Through the specially made decoder card and its coupling card reader, safe data opening or synchronizing can be provided to the application system. The implementation can be a series of application softwares, games and multi-media content. Protection of contents is achieved by the method discussed in the present patent application, in which a novel operation method is created.

The implementation system in the embodiment of the present patent application includes three components and will be described in the below.

The first component is the fascinated decoder card (in simple term: decoder card.) The decoder card includes a card base which is produced from at least one type of materials selected from paper card, plastic card, metal thin card or organic glass thin card. Obviously, other materials may be used to produce the card base. The shape of the card base may be similar to that of common smart card. The card base may also be in other shapes.

The surface of the card base is applied with conducting coating. The region and area encompassed by the conducting coating on the card base may be set based on advance defining. The conducting coating uses carbon film as the transmission medium and is applied onto the surface of the card base by means of printing or pad printing. During the production of the decoder card, the conducting coating is provided with a plurality of conducting logic expression regions. Different conducting logic expression regions possess individual and independent conductive nature. In other words, the conductive nature of each conductive logic expression region is not related to the conductive nature of other conductive logic expression regions. They can be the same or different. This way, the groups of conductive nature of the plurality of conductive logic expression regions form the conductive logic data code that defines the decoding card. The conductive nature of each conductive logic expression region is defined by the open or short circuit through individual recognition circuit contact. When setting a conductive nature of each conductive logic expression region on the decoder card, which is setting a conductive logic data code that is unique and does not repeat from those conductive logic expression regions on the decoder card. The decoder card may be identified and be distinguished from other decoder cards. The conductive nature of each conductive logic expression region corresponds to a data bit of the conductive logic data code. The conductive logic data code is a data sequence formed from the bit data arranged according to pre-set arrangement method which corresponds to each conductive logic expression region on the decoder card. Further, the card base is printed with serial numbers consist of series of characters. Each character in the serial number is selected from at least a form of barcodes, English alphabets and numerals. The serial number of each decoder card corresponds to its conductive logic data code. The serial number of each decoder is mutually independent. As a result, if any user seeks to illegally change the conductive coating, in most situations it is not possible to produce the same legal conductive logic data coding. Even if a certain conductive logic data code is changed, since the conductive logic data code formed from the conductive coating after the change must not correspond to the serial numbers on the decoder card, such uncommon event of change may still be prevented through matching the serial numbers with the conductive logic data coding. The decoder card may apply the regular surface coating and dual side printing technology to undergo processing and production and may be produced in batches. During the production of the card, the group expression formats of the conductive logic expression region are different and do not repeat, and the same does not require to undergo processes such as PCB development and etching. The electrical characteristic of the conducting coating is suitable for operation under small electric current and low voltage. The parameter scope of a small electric current below 500 mA may be set at, for example, 80 to 250 mA. The parameter scope of a low-voltage below 5V may be set at, for example, 1.2 to 5 volts.

The second component is the card reader. The card reader is a device specially designed for reading the above decoder card. The card reader includes a slot for insertion of the decoder card. After the decoder card is inserted, the physical contact inside the slot correspondingly contact with the conductive logic expression region on the decoder and conductive nature of each conducting logic expression region of the decoder card is read. Since the decoder card includes a plurality of conductive logic expression regions, the slot is provided with corresponding physical contact point and connects with the recognition circuit contact of these conductive logic expression regions, and applies physical contact in the form of matrix multibus. It includes tens to multiples of tens of buses in multi-rows and multi-columns, such that it may obtain all the conductive natures of the conducting logic expression regions on the decoder at almost the same time.

The card reader includes a processor. The processor reads, through the physical contact between the trough and the decoder, and obtains the conductive nature of each conductive logic expression region of the decoder card so that the conductive logic data code of the decoder card can be analysed. Through pre-set data agreement (this data agreement is known as "FW-Protocol," which provides a set of pre-determined data conversion guidelines, that is, a code conversion formula that converts a group of characters in a chain according to pre-determined guidelines to another group of characters in a chain), the processor compiles the conductive logic data code as electronic cipher code (equivalent to secondary code). Since the conductive logic data code of the decoder card is unique and does not repeat, the electronic cipher code formed from the secondary code is also unique and does not repeat. This provides suitable keying for the applications such as data opening or synchronizing. The size of electronic cipher code may be set according to needs. The cipher code may include 4-8 groups of codes which are formed from 16-256 bit codes. Since the conductive logic data code of the card reader is a data that cannot be changed physically, it possesses uniqueness. Under certain conditions, expansion is not suitable. Through secondary code, adjustment can be made according to needs so that under common situations the conductive logic data code does not record any contents, and is the key to open corresponding applications, contents or perform functions.

The card reader includes a data interface that connects to the processor. The data interface may be the standard data interface nowadays, such as wire USB interface, or wireless WIFI interface, Bluetooth interface, etc. Therefore, the card reader may externally connect to the terminal equipment and transmit the electronic cipher code to the connected terminal equipment through the data interface.

In summary, the main function of the card reader is to decode the conductive coating data on the decoder card, and perform logic decryptions and numeral conversions. The data is transmitted to the terminal equipment through USB interface or wireless method, such processes include: 1) corresponding work is done to correspond the conducting logic on the decoder card, through physical contact between the slot and the decoder card, the conductive nature of each conductive logic expression region is obtained; 2) using the pre-set decoding compilation agreement, the conductive logic data code of the decoder card is decrypted and compiled as electronic cipher code; 3) using the standard data interface to send and receive via wire or wireless transmission to perform online communication with PCs or hand held devices.

The third component is the terminal equipment. Terminal equipment can be smart mobile phones or personal electronic devices, such as computers running Microsoft Windows, Mac or Linux operating systems, or standard smart devices such as Chrome Book, or smart mobile devices such as i-Touch, i-Phone, i-Pad, Android handheld phones or handheld devices.

Terminal equipment includes applied processing unit for reading the electronic cipher code and running relevant applied routines that corresponds to the electronic cipher code. Terminal equipments normally is provided with a central processor (it is hereby called applied processing unit). Through connection between the terminal equipment and the card reader (the decoder card is already inserted into the card reader), the terminal equipment obtains the electronic cipher code transmitted by the data interface of the card reader. By manipulating this electronic cipher code, the terminal equipment opens the specific media contents so that the orders on the applied software can be executed.

The electronic cipher code can be used on accessing of data, synchronization of data, specific orders etc. In one execution, the electronic cipher code is the key to open certain application software. In another embodiment, such as gaming applications, the electronic cipher code not only provides a access restrictions for entering games, it also provides a specific operation of certain character role in the game. Below is an example explained based on FIG. 1.

Firstly, a "card game" type of game may be developed. The game runs on the terminal equipment of PCs or smart mobile phones etc and includes multiple character roles and different personalities corresponding to the different character roles.

Secondly, decoder cards that represent different character roles and operation of the game are produced. On the decoder card, one can draw out corresponding pattern to illustrate by intuition the character roles and their corresponding personalities in the game as shown by the decoder card. For example, presuming there are two sets of decoder cards, corresponding with a character set and a tool set. The character set includes multiple character roles in the game. Each character role in the game can possesses personality such as aggressiveness, defensiveness, liveliness and mana etc. the tool set includes multiple tools in the game. Different tools in the game can change certain or several kinds of personalities of the character roles in the game. For example, a fighting tool card can enhance the aggressiveness of a character role in the game etc. Different character roles and their corresponding personalities in the game of different decoders can be directly illustrated by the conducting logic data encoding and can also be illustrated by the electronic secret code of the corresponding secondary encoding. Better flexibility can be possessed through the illustration of the electronic secret code, and incompatibility between the conducting logic data encoding and the pre-determined character roles with their respective personalities in the game which is caused by error made during printing at certain situations can be prevented. The electronic secret code can thus be used to make such amendment.

Again, specially designed to decode the card reader of the above decoder, the card reader can connect with the terminal equipment through the data interface. When the decoder is inserted into the trough of the card reader, the card reader can read the conducting logic data encoding of the decoder through physical contact and compile as the corresponding electronic secret code according to pre-determined data agreement. While later the electronic secret code can be transmitted to the terminal equipment through the data interface.

The terminal equipment of the game that runs the "card game," after obtaining the electronic secret code, decodes the character roles and their respective personalities in the game represented by the electronic secret code. Then later the corresponding character roles in the game can be created (first time using the decoder) or removed and their corresponding personalities can be bestowed, so that the interaction with the decoders can be realized.

As FIG. 1 illustrates, the operation procedure mainly includes:

1) After the decoder is inserted into the card reader, the card reader obtains the conducting logic data encoding of the decoder through physical contact and compiles as the electronic secret code.
2) The card reader transmits the electronic secret code to the terminal equipment through WIFI or USB transmission.
3) The terminal equipment pairs the electronic secret code and its related data, which are the decoder data transmitted from the card reader, and confirms whether the data is the relevant applied procedure, or the data of the above mentioned game.
4) After the pairing is successful, then the pairing data is applied onto the game, such as controlling the corresponding character roles in the game according to these character roles and their operations in the game as illustrated by the decoder.
   Referring to FIGS. 2, 3, 4 and 5, after the decoder C01 is inserted into the card reader R01, the conducting logic expression region on the conducting coating contacts at the physical contact point of the card reader trough R02, so as to allow the card reader R01 to obtain the conducting logic data encoding. The contact reading status between the card reader R01 and the decoder C01 is controlled through the on/off switch R03. On the card reader R01 is situated with a first LED indicating lamp L01, a second LED indicating lamp L02, a third LED indicating lamp L03, which instruct the card reader to connect with the status of the terminal equipment, status of the decoder when unable to read or needs to re-register, and the status of whether the decoder can be read, respectively.

The specific workflow of the applied system is as follows:
1) The card reader R01 connects to the power source, the terminal equipment connects with the card reader through the USB or wireless agreement, the first LED indicating lamp L01 reminds that the card reader is connected to the terminal equipment.
2) The decoder C01 is inserted into the card reader R01, the third LED indicating lamp L03 reminds whether the decoder C01 can be read, if the first reading is not successful, the second LED indicating lamp L02 reminds whether re-registration is necessary. If not, the registration procedure is terminated and the card reader R01 is closed; the re-registration then returns to re-read the decoder C01. If re-reading is not successful, then the second LED indicating lamp L02 reminds that the decoder has not been read and whether a re-try is necessary. If re-try is not necessary, then the registration procedure is terminated and the card reader R01 is closed; re-try returns to re-read the decoder C01.
3) When the decoder C01 is successfully read, the data conversion procedure of the card reader R01 converts and output the conducting logic data encoding of the decoder C01 to the electronic secret code, and transmits to the terminal equipment.
4) The terminal equipment reminds whether the electronic secret code is correct and whether to synchronize cloud server data. If not, then registration of another decoder is established. If yes, the electronic secret code is transmitted to the cloud server. The cloud server data at the same time reminds whether to register or execute the procedure. If the data has already been registered, then re-registration and running the applied procedure are not necessary. If the data is new, then registration is requested. If registration is abandoned, then returning to the terminal equipment. If registration is confirmed, then after registration is completed, remind whether to execute applied procedure. If yes, the applied procedure is started. Otherwise, the registration procedure is terminated and the card reader is closed. After the cloud server finished the registration of the impending decoding, the registration procedure of another decoder is established.

As previously mentioned, the conducting logic data encoding cannot be changed in physical term. If an illegal user purposely changes the logic data on the card, the following situations may be caused:
  a) The data has not been established on the system. The card is invalid, if the user tries the above procedure several times, the account number of the user will be automatically locked, rendering the card reader will also be automatically locked and loses its function. Upon confirmation by the managing staff that the error is not due to amendment made by human, the accounting number of the user and the card reader will be reactivated. This method can effectively protect reasonable privileges of both sides.
  b) The data has already been established on the system. If the registration has not been made, since the card reader can record the using and reading conditions, only if a person can guess correctly the first time, or else the system will request the user to manually input the sequence number. For example, under the condition that if the $1^{st}$ to $3^{rd}$ inputs are incorrect, the account number of the user will automatically be locked and the card reader will also automatically be locked and loses its function.
  c) The data has already been registered. The system will request the user to manually input the sequence number. Under the condition that if the $1^{st}$ to $3^{rd}$ inputs are incorrect, the account number of the user will be automatically locked, and the card reader will also be automatically locked and loses its function.
  d) The data has already been registered. The system will request the user to manually input the sequence number. If the sequence number is correct, the system will automatically lock the other user from using this set of encoding. The system does not allow the existence of two sets of the same encoding.

The present patent application is directed to mainly prevent user from easily performing infringing act by means of optical copying technology. Further, a relatively simple sequence number opening method is more reliable.

In the embodiment of the present application, the physical contact point of the conducting logic expression region on the decoder forms a plurality of data bus formats with multiple rows and multiple columns. The common interface of normal PCs or handheld smart device etc. cannot withstand a large amount of multi-bus data to be inputted. The card reader in the embodiment of the present application, the trough is specially made to read the conducting logic data encoding of the decoder by means of matrix multi-bus physical contact form. The conducting logic data of physics is converted to the electronic data commonly used in software. On the card reader comprises encoding conversion formula of the logic data, causing the unique logic data secret code to be changed to the unique electronic secret code. The card reader can also prevent user from abnormal data inputting or maliciously damaging the data system of the present application.

In view of the above, the present patent application includes the following characteristics:

The decoder uses the conducting nature of the conducting coating as the data expression or differentiation method, in coupled with the conducting logic reader, which is equivalent to above method of the card reader, and reads and transmits the electronic secret code. Since the conducting nature is a physical characteristic inside the conducting coating, through the exterior of the conducting coating such as pattern, drawing etc characteristics which cannot be decoded, the copying of the same by copying machine or scanner as such equipments can be prevented. At present time, there are no available copying devices capable of such copying. Since the conducting logic data encoding is a kind of directly contacted, physical form of logic secret code, it not only possesses a relatively strong data security level, further, it is different from common forms of smart card that requires memory such as flash, ROM through which to save data. It doesn't require any memory and can directly record in the conducting nature of conducting coating.

The conducting logic expression or differentiation method of the decoder is designed as a single card having an independent data. Therefore, it can derive a game card that possesses many different identities in a same role, or a game card that possesses the same role with different operations. The system can distinguish out the number of cards of the same kind that are possessed by the user. For example, media content design of the game in the terminal equipment can require user to possess 10 to 20 cards with the same character role in order to be combined and formed as a character role at another level, so as to assist the design of the media content to be fully utilized and expanded.

The method of connection and transmission of data of all the parts, besides those between the decoder and the card reader, uses the design of the standard agreement method.

Hence, the application level, versatility and popularity can be enhanced, rendering the applied system and method in the embodiment of the present application suitable to be used on one or more than one standard terminal equipments, and can run beyond platforms. For example, start the same applied procedure and perform media content interaction of the game between many terminal equipments on the sharing network.

The applied system and method in the embodiment of the present patent application, which design is suitable to be applied on the standard terminal equipments (including home PCs, business PCs, notebook, smart phones or smart system devices etc that are common and belong to different brands), they can be used normally without needing to alter or re-design the hardware or software of the PCs or notebook. The maintenance of the PCs or smart devices in the future would not be affected.

The applied system and method in the embodiment of the present patent application, a new design of the media opening method in card form is used to perform application and interacting function. Such function does not contain any sensitive information relating to personal data or private matter, and would not have any problems relating to leakage of privacy or sensitive information. They can effectively prevent illegal user from stealing the account of legal user. The legal user merely needs to take out the card and can be verified immediately. This can also effectively protect the card data of the legal user and the virtual objects in the applied procedure of the user, since the possession of the card is the actual physical evidence.

The conducting logic data encoding on the decoder, uses a unique card reader to synchronize the data automatically, the user merely needs to perform one single registration procedure before beginning to use. The registered decoder can be traded freely at designated retail or service locations. The designated service or retail locations can read and transfer the status of the registered decoder inside the account of the user. While the decoder is distinguished independently, each card is unique and is a secure component that is individually independent. Its function is only to open the corresponding data or media which is used on the applied procedure or game. The applied procedure or game procedure use the card media as the guidance. Normally 80 to 100 cards media can be used for application and operation. This way, a one on one security protection method is possessed. At the same time, the expandability of the card coupling with the media contents is very high.

The application system and method of the embodiment in the present application, whose beneficial characteristics include:

1) The user does not need to change application of the terminal equipment with standard configuration (including home PCs, business PCs, notebook, smart phones or smart system devices etc that are common and of different brands), and does not need to install security components on the terminal equipment. The user merely needs to use the standard terminal equipment (such as standard brand or non-standard brand PCs, notebooks, smart handheld devices, smart phones as i-Phone, iPad, iTouch, Android Phone etc), and standard operating system (such as microsoft window system, Mac OS, iOS, Android, Linux, MeeGo etc.), the user does not need to change any hardware or software, and can perform applied procedure or game procedure. After the card reader connects to the terminal equipment, the registration procedure can be completed quickly and undergoes the applied procedure or game procedure etc.

2) The standard agreement connection is applied as the data transmission method, and does not affect the guaranteed protection law of the terminal equipment of the user (including home PCs, business PCs, notebooks, smart phones or smart system devices etc that are common and of different brands). On different terminal equipments, the created applied procedure or game procedure merely requires to install the software procedure for decoding the electronic secret code sent from the card reader. The data can be applied or operated on any terminal equipments, and realise cross platforms application. Those applicability, practicality and popularity are greatly enhanced.

3) The operation method is created using a standard operation agreement, and can be applied without the need to change the hardware or software on the terminal equipments. The user does not need to be responsible for any unnecessary loss or risk.

4) After the decoder has been at one time registered, it can be used indefinitely. The data or media data on the card only synchronize with the account of the registered user. For the card after registration, if the user carelessly lost or damaged the same, the data inside the user account will not be affected. If the above situation occurs, the user at most cannot perform trading of the decoder, and will not bear in reality any economic loss.

The above contents are a combination of specific embodiments that further describe the present application, and cannot be taken as specific embodiments of the present patent application are limited to these descriptions. For those skilled in the art of the present patent application, under the condition that the present inventive concepts are not departed, several simple displays or replacements can be made and can be viewed as belonging within the scope of protection of the present patent application.

The invention claimed is:

1. A system for applying to a decoder, the decoder comprising a card base having a surface, wherein the surface of the card base is coated with a conductive coating and the conductive coating is provided with a plurality of conductive logic expression regions, each conductive logic expression region is provided with an individual and independent conductive nature, the conductive nature of each conductive logic expression region on the conductive coating together form a sole conductive logic data coding for differentiating a specific decoder so that the decoder can be distinguished from other decoders; wherein the system comprises a card reader that comprises a slot for insertion of the decoder and engagement with the conductive logic expression regions of the decoder by physical contact; and a terminal equipment, wherein the card reader further comprises an electronic code processor which compiles the conductive logic data coding to a cipher code using predefined data protocols comprising code conversion formulas, and a data port that connects to the processor and transmits the cipher code to the terminal equipment; and the cipher code comprises 4-8 groups of codes which are formed from 16-256 bit codes.

2. The system according to claim 1, wherein the card base is selected from at least one of the following materials: paper card, plastic card, metal thin card and organic glass card.

3. The system according to claim 2, wherein the card base is printed with serial numbers comprises of series of characters, each character in the serial number is selected from at least a form of barcodes, English alphabets and numerals; the serial number of each decoder card corresponds to its conductive logic data coding and the serial number of each decoder is mutually independent.

4. The system according to claim 3, wherein each conductive logic expression region comprises a recognition circuit having a contact point, the contact point comprises an open and short state, the conductive nature of each conductive logic expression region is indicated by the open and short state of the contact point of its own recognition circuit.

5. The system according to claim 1, wherein the conductive nature of each conductive logic expression region corresponds to a data bit of the conductive logic data coding, the conductive logic data coding is a data sequence formed according to a pre-determined sequence by the corresponding data bit of each of the conductive logic expression region on the decoder.

6. The system according to claim 5, wherein the surface of the card base is coated by means of printing or pad-printing with a conductive coating that uses a carbon film as a transmission medium, the conductive coating has an electrical characteristic suitable to be operated under a small electric current below 500 mA and low-voltage environment below 5V.

7. The system according to claim 1, wherein the conductive logic data coding of the decoder is read by way of physical contact between the slot and each of the conductive logic expression regions of the decoder.

8. The system according to claim 1, wherein the data port comprises a USB, wireless WIFI, or Bluetooth interface.

9. The system according to claim 1, wherein physical contact between the slot and each of the conductive logic expression regions of the decoder is in matrix multibus form.

10. The system according to claim 1, the terminal equipment is a personal computer or a mobile device running Microsoft Windows, Apple/Mac, iOS, Android or Linux operating systems.

11. The system according to claim 1, the terminal equipment comprises an applied processing unit for reading the cipher code and running associated applications.

12. The system according to claim 1, the terminal equipment further comprises a plurality of individually associated applications which are run by the terminal equipment via its coupled card reader and decoder; interactions of media contents of the associated applications between the terminal equipment and other terminal equipments running the same associated applications are achieved via networking.

* * * * *